United States Patent
Matsuda et al.

(10) Patent No.: US 7,165,851 B2
(45) Date of Patent: Jan. 23, 2007

(54) OPTICAL FREQUENCY LINEAR CHIRP VARIABLE UNIT

(75) Inventors: Isao Matsuda, Kanagawa (JP); Kazuhiko Misawa, Tokyo (JP); Hiroyoshi Lang, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/549,575

(22) PCT Filed: Mar. 23, 2004

(86) PCT No.: PCT/JP2004/003911

§ 371 (c)(1),
(2), (4) Date: Sep. 19, 2005

(87) PCT Pub. No.: WO2004/086118

PCT Pub. Date: Oct. 7, 2004

(65) Prior Publication Data

US 2006/0181789 A1    Aug. 17, 2006

(30) Foreign Application Priority Data

Mar. 24, 2003 (JP) ............................. 2003-081170

(51) Int. Cl.
*G02B 5/04* (2006.01)
*G02B 26/00* (2006.01)

(52) U.S. Cl. ..................... 359/615; 359/238; 359/239

(58) Field of Classification Search ............... 359/238, 359/239, 615
See application file for complete search history.

(56) References Cited

U.S. PATENT DOCUMENTS 3,498,693 A * 3/1970 Markin et al. .............. 359/317

(Continued)

FOREIGN PATENT DOCUMENTS

JP  2001-313607  11/2001

OTHER PUBLICATIONS

Translation of the International Preliminary Report on Patentability of International Application No. PCT/JP2004/003911, with Form PCT/IB/338, PCT/IB/237 and Form PCT/ISA/326.

(Continued)

*Primary Examiner*—Drew A. Dunn
*Assistant Examiner*—Aline D. McNaull
(74) *Attorney, Agent, or Firm*—Westerman, Hattori, Daniels & Adrian, LLP

(57) ABSTRACT

A linear opto-frequency chirp amount variable apparatus using a dielectric multilayer film mirror, which does not require the optical axis to be realigned each time the amount of a chirp is to be varied includes a pair of opposed, parallel, dielectric, multilayer film mirrors, and a movable mirror between the dielectric multilayer film mirrors. The movable mirror is inclined so that oblique, incident light, projected into the space between the two dielectric multilayer film mirrors, is reflected between them a plurality of times and then is reflected by the movable mirror into a direction parallel to the dielectric multilayer film mirror surfaces and in an incidence plane defined by the incident light and a plane-normal to each dielectric multilayer film mirror and toward the incident light. Moving the movable mirror forwards and backwards, parallel to the multilayer film mirrors changes the amount of a chirp.

3 Claims, 5 Drawing Sheets

U.S. PATENT DOCUMENTS

| | | | |
|---|---|---|---|
| 3,675,154 A | * | 7/1972 | Duguay et al. ............... 372/33 |
| 2003/0021527 A1 | * | 1/2003 | Mitamura et al. ............ 385/27 |
| 2005/0100274 A1 | * | 5/2005 | Yamashita et al. ............ 385/27 |

OTHER PUBLICATIONS

K. Misawa et al.; "Wave-packet dynamics in a cyanine dye molecule excited with femtosecond chirped pulses", Journal of Chemical Physics, vol. 113, No. 17, Nov. 1, 2000, pp. 7546-7553. Cited in the specification.

G. Cerullo et al.; "High-power femtosecond chirped pulse excitation of molecules in solution", Chemical Physics Letter, vol. 262, Nov. 15, 1996, pp. 362-368. Cited in the specification.

C. J. Bardeen et al.; "Selective Excitation of Vibrational Wave Packet Motion Using Chirped Pulses", Physical Review Letters, vol. 75, No. 19, Nov. 6, 1995, pp. 3410-3413. Cited in the specification.

J. L. Herek et al.; "Quantum control of energy flow in light harvesting", Letters to Nature, 2002, pp. 533-535. Cited in the specification.

R. Szipöcs et al.; "Chirped multilayer coatings for broadband dispersion control in femtosecond lasers", Optics Letters, vol. 19, No. 3, Feb. 1, 1994, pp. 201-203. Cited in the specification.

Rick Trebino et al.; "Measuring ultrashort laser pulses in the time-frequency domain using frequency-resolved optical gating", American Institute of Physics, Rev. Sci. Instrum. vol. 68, No. 9, Sep. 1997, pp. 3277-3295. Cited in the specification.

* cited by examiner (a)

(b)

(a)

(b)

OPTICAL FREQUENCY LINEAR CHIRP VARIABLE UNIT

TECHNICAL FIELD

The present invention relates to a linear opto-frequency chirp amount variable apparatus, i. e., an apparatus whereby a linear chirp in optical frequency imparted is made variable in amount, for use in the fields of photochemical reactions, machining of optical materials and ultrafast optical communication.

BACKGROUND ART

In recent years, femtosecond light pulses have been utilized in a variety of forms for controlling molecular states, the electronic state of a solid, and chemical reactions and machining a material (see, for example, References 1 to 5 listed below). Also, as the application of femtosecond light pulses is expanding, demands have increased for a pulse generator for a femtosecond light pulse that is shorter in time width and for a femtosecond light pulse applied apparatus that excels in cost reduction and easiness for using.

Of importance to meet with these demands is the technique of linearly chirping the frequency of femtosecond light pulses. Frequency chirping is the phenomenon that the instantaneous frequency of a light pulse changes with time, wherein the case that it increases linearly with time is called positive chirping and the case that it decreases linearly with time is called negative chirping.

Generating a femtosecond light pulse is by way of a technique whereby relative phases between spectral components of a light pulse spreading in time width are controlled to compress the time width to a limit of the Fourier transformation. Since a light pulse is spread on the time axis according to a relationship in relative phases between spectral components of the light pulse, the light pulse is compressed by compensating for relative phases with respect to frequency, namely by chirping (see, for example, Reference 6). Linear chirp as it occurs when the propagation constant of light has constant group velocity dispersion, namely dependence on the square of frequency, is also referred to as secondary dispersion.

While demands to further narrow the time width of a femtosecond light pulse are rising, the fact that narrowing the time width of a light pulse expands its frequency spectral bandwidth correspondingly makes it necessary to impart a chirp to the ranges all between the expanded frequency spectral components and thus to impart a large chirp to frequency ranges wider than those heretofore.

Further, with the recent discovery that the electronic state of a material brought about when it is irradiated with femtosecond light pulses is varied according to the direction of a chirp, it has become necessary to precisely control the direction and amount of a chirp in order to synthesize a new material on the basis of such a new principle. Also, in the field of optical communication, in order to remove or reduce the time spread of a light pulse signal, or the time delay between successive wavelength signals in WDM (wavelength Division Multiplexing), there has become necessary a chirp control apparatus which can control or change the direction of a chirp and the magnitude of its amount as desired and which excels in cost reduction and easiness for using. While demands for the linear chirp technique have thus been growing considerably, they can hardly be met by conventional linear chip techniques as described below.

While it is generally easy to impart a positive chirp to a light pulse, imparting a negative chirp thereto has called for a complicated mechanism. A typical apparatus in the prior art for controlling a chirp amount employs a prism pair or a pair of diffraction gratings wherein the distance between such optical elements in the pair is varied to change the amount of a negative chirp (see Reference 7). However, the attempt to apply a large negative chirp over an extended frequency spectral range gives rise to the problem that there come to be imparted not only the linear chirp, namely secondary dispersion but also dispersions higher in order than the secondary.

There has also been a chirp control apparatus using liquid crystal devices or variable diffraction grating mirrors which to spatially disperse the spectrum of a light pulse with dependence on its frequencies are spatially disposed at different positions for different frequencies whereby the frequency components after each of them has a given phase imparted thereto are added together. Such an apparatus has the problem, however, that among others, the liquid crystal device is low in damaging threshold to light energy and thus can not endure the use of a high-energy light pulse and also the problem that the apparatus itself must be large in size, thus becoming costly and poor in easiness for using.

There has further been a chirp control apparatus using a dielectric multilayer film mirror (see Reference 8) which is formed from two or more optical films different in index of refraction (dielectric constant) and by laminating such films alternately a plurality of times while controlling their thicknesses so that light reflected from the laminate has a phase proportional to frequency. This apparatus using optical materials, such as $SiO_2$ and $TiO_2$, which are high in the damaging threshold to light energy, to form the dielectric multilayer film can well endure the use of high-energy light pulses. Further, the apparatus simply having a dielectric multilayer film mirror reflect a light pulse is small in size.

REFERENCES CITED

Reference 1: Kazuhiko Misawa and Takayoshi Kobayashi, J. Chem. Phys. 113 (2000):

Reference 2: G. Cerullo, C. J. Bardeen, Q. Wang, and C. V. Shank, Chem. Phys. Lett. 262, 362 (1996);

Reference 3: C. J. Bardeen, Q. Wang, and C. V. Shank, Phys. Rev. Lett. 75, 3410

Reference 4: J. Cao, C. J. Bardeen, and K. R. Wilson, Phys. Rev. Lett. 80, 1406 (1998);

Reference 5: Jennifer L. Herek, Wendel Wohlleben, Richard J. Cogdell, Dirk Zeidler & Marcus Motzkus, "Quantum control of energy flow in light Harvesting", Nature 417, 533 (2002);

Reference 6: Maruzen Advanced Technology, Edition for Electronics, Information and Communication, edited by Tatsuo Yajima, Maruzen K. K., issued Mar. 15, 1990, pages 18–19;

Reference 7: Maruzen Advanced Technology, Edition for Electronics, Information and Communication, edited by Tatsuo Yajima, Maruzen K. K., issued Mar. 15, 1990, pages 96–97;

Reference 8: Robert Szipocs and Karpat Ferencz, Christian Spielmann and Ferenc Krausz "Chirped multilayer coatings for broadband dispersion control in femtosecond lasers", Optics Letters Vol. 19, No. 3, 1994. 2. 1, 201; and Reference 9: Rick Trebino, Kenneth W. DeLong, David N. Fittinghoff, John N. Sweetser, Marco A. Krumbugel, and Bruce A. Richman, and Daniel J. Kane "Measuring ultrashort laser pulses in the time-frequency domain using frequency-resolved optical gating", Rev. Sci. Instrum. 68(9), 3277 (1997).

However, the conventional linear chirp apparatus using a dielectric multilayer film mirror has problems as mentioned below.

FIG. 5 diagrammatically illustrates a conventional linear chirp apparatus using dielectric multilayer film mirrors. The apparatus illustrated comprises two dielectric multilayer film mirrors 51 and 51 whose relative positions can be adjusted to change the number of reflections of a light pulse 52 by them, thereby controlling the amount of a chirp applied to the light pulse 52. FIG. 5(a) shows the case that the number of reflections is two (2) whereas FIG. 5(b) shows the case that the number of reflections is four (4). The broken line shown in FIG. 5(b) indicates the optical axis in the case of the number of reflections being two as shown in FIG. 5(a). It is thus required that the dielectric multilayer film mirrors 51 and 51 be moved relatively away from each other to decrease the number of reflections if the negative chirp amount should be reduced and that they be moved relatively towards each other to increase the number of reflections if the negative chirp amount should be augmented.

In this makeup, the optical axis, as indicated by the solid and broken lines shown in FIG. 5(b), becomes deviated in position each time the number of reflections, that is the amount of chirp, is to be varied from one set value to another. In this way, the conventional apparatus using the dielectric multilayer film mirrors which makes the amount of chirp variable has required the optical axis to be realigned each time the amount of chirp is to be varied or has called for an optical system for readjustment of the optical axis and has thus been extremely low in easiness for using.

DISCLOSURE OF THE INVENTION

In view of the problems mentioned above, it is an object of the present invention to provide a linear opto-frequency chirp amount variable apparatus (an apparatus whereby a linear chirp in optical frequency imparted is made variable in amount) that does not require the optical axis to be realigned each time the amount of a chirp is to be varied.

In order to achieve the object mentioned above, there is provided in accordance with the present invention a linear opto-frequency chirp amount variable apparatus (an apparatus whereby a linear chirp in optical frequency imparted is made variable in amount), characterized in that it comprises a pair of dielectric multilayer film mirrors arranged so that their mirror surfaces extend parallel, and are opposed, to each other, and a movable mirror which is disposed in a space defined between the two dielectric multilayer film mirrors and which is inclined at a given inclination and movable in a given movable direction, wherein the said given inclination of the movable mirror is an inclination such that an incident light that is incident obliquely from one end of the space defined between the two dielectric multilayer film mirrors and is then allowed to reflect on and between them a plurality of times is reflected by the movable mirror into a direction parallel to the said dielectric multilayer film mirror surfaces in an incidence plane defined by the said incident light and a plane-normal to each of the said dielectric multilayer film mirrors and towards the said one end, and the said given movable direction is a direction that is parallel to the said dielectric multilayer film mirror surfaces and extends in the said incidence plane, whereby moving the said movable mirror forwards and backwards in the said movable direction changes the amount of a chirp to be imparted to the said incident light as an input light.

According to the apparatus makeup mentioned above, a light incident from one end of the two dielectric multilayer film mirrors arranged parallel to each other is allowed to reach the movable mirror upon reflecting a plurality of times on and between the dielectric multilayer film mirrors and then to be reflected by the movable mirror and to outgo as a light ray propagating parallel to the mirror surfaces of the dielectric multilayer film mirrors and in the incidence plane. Thus, moving the movable mirror forwards or backwards to change the number of reflections of the input light allows a chirp with an amount proportional to a number of such reflections to be imparted thereto while maintaining the direction in which an output light issues constant regardless of a position which the movable mirror takes. As a result, there is here provided a linear opto-frequency chirp amount variable apparatus which has no need to realign the optical axis each time the amount of a chirp is to be altered or to additionally include any optical system for alignment of the optical axis and which thus excels in cost reduction and easiness for using.

The present invention also provides in a second makeup thereof a linear opto-frequency chirp amount variable apparatus (an apparatus whereby a linear chirp in optical frequency imparted is made variable in amount), characterized in that it comprises a pair of dielectric multilayer film mirrors arranged so that their mirror surfaces extend parallel, and are opposed, to each other, and a first and a second movable mirror which are disposed in a space defined between the two dielectric multilayer film mirrors and each of which is inclined at a given inclination and movable in a given movable direction, wherein the said given inclination of the first movable mirror is an inclination such that an incident light that is incident parallel to the said dielectric multilayer film mirror surfaces from one end of the space defined between the said multilayer film mirrors is reflected by the first movable mirror so as to reflect on and between the said mirror surfaces a plurality of times in an incidence plane defined by the said incident light and a plane-normal of each of the said dielectric multilayer mirrors, the said given inclination of the second movable mirror is an inclination such that the said incident light having reflected a plurality of times as aforesaid is reflected by the second movable mirror into a direction parallel to the said dielectric multilayer film mirror surfaces in the said incidence plane and towards the other end of the said space, the said given movable direction is a direction that is parallel to the said dielectric multilayer film mirror surfaces and extends in the said incidence plane, whereby moving the said first or second movable mirror forwards or backwards in the said movable direction to change the distance between them changes the amount of a chirp to be imparted to the said incident light as an input light.

According to the second apparatus makeup mentioned above, an incoming light incident parallel to the dielectric multilayer film mirror surfaces from one end of the two dielectric multilayer film mirrors arranged parallel to each other is allowed to be reflected by the first movable mirror so as to reach the second movable mirror upon reflecting on and between the two dielectric multilayer film mirrors a plurality of times and then to be reflected by the second movable mirror and to outgo from the other end of the space defined between the two dielectric multilayer mirrors and in the same direction in which it is incident. Thus, moving the first or second movable mirror forwards or backwards allows changing the amount of a chirp to be imparted to the incident light as an incoming light while permitting an outgoing light to propagate in the same direction as the incoming light. To wit, this second linear opto-frequency chirp amount variable apparatus has the feature that a light is outgoing or output in a direction same as that in which it was incoming or input.

The present invention further provides in a third makeup thereof a linear opto-frequency chirp amount variable apparatus (an apparatus whereby a linear chirp in optical frequency imparted is made variable in amount), characterized in that it comprises a pair of dielectric multilayer film mirrors arranged so that their mirror surfaces extend parallel, and are opposed, to each other; a fixed mirror disposed in a space defined between the two dielectric multilayer film mirrors at a center of the space, the fixed mirror having a first and a second reflecting surface each of which is inclined at a given inclination; and a first and a second movable mirror which are disposed at opposite sides of the fixed mirror, respectively, and each of which is movable in a given movable direction, wherein the said given inclination of the first reflecting surface of said fixed mirror is an inclination such that an incident light that is incident parallel to the said dielectric multilayer film mirror surfaces from one end of the space defined between the said two dielectric multilayer film mirrors is reflected by the said first reflecting surface so as to reflect on and between the said dielectric multilayer film mirrors a plurality of times in an incidence plane defined by the said incident light and a plane-normal of each of the said dielectric multilayer mirror surfaces, the said given inclination of the first movable mirror is an inclination such that the incident light having reflected a plurality of times as aforesaid is reflected by the said first movable mirror into a direction that is parallel to the said dielectric multilayer film mirror surfaces and extends in said incidence plane, towards said second movable mirror, the said given inclination of the second movable mirror is an inclination such that the light having reflected from the said first movable mirror is reflected by the said second movable mirror so as to reflect on and between the said dielectric multilayer film mirrors a plurality of times in the said incidence plane, the said inclination of the second reflecting surface of the said fixed mirror is an inclination such that the light from the said second movable mirror, upon having reflected a plurality of times as aforesaid, is reflected by the said second reflecting surface into a direction that is parallel to the said dielectric multilayer film mirror surfaces in the said incidence plane and towards the other end of the said space, and the said given movable direction is a direction that is parallel to the said dielectric multilayer film mirror surfaces and extends in the said incidence plane, whereby moving the said first or second movable mirror forwards or backwards in the said movable direction to change the distance between them changes the amount of a chirp to be imparted to the said incident light as an input light.

According to the third apparatus makeup mentioned above, an incoming light incident parallel to the dielectric multilayer film mirror surfaces from one end of the two dielectric multilayer film mirrors arranged parallel to each other is allowed to be reflected by the first reflecting surface of the fixed mirror so as to reach the first movable mirror upon reflecting on and between the two dielectric multilayer film mirrors a plurality of times, then to be reflected by the first movable mirror into a direction same as that in which it is incident to reach the second movable mirror, then to be reflected by the second movable mirror so as to reflect on and between the two dielectric multilayer film mirrors a plurality of times to reach the second reflecting surface of the fixed mirror, and finally to be reflected by the second reflecting surface of the fixed mirror so as to outgo from the other end of the space in a direction same as that in which it is incident. An apparatus is accordingly provided that is capable of controlling the number of reflections for an input light by controlling the distance between the first and second movable mirrors and thus imparting to the input light an amount of chirp proportional to a number of reflections thereof and emitting an output light in a direction same as the input light is incident while permitting its angle of incidence to be reduced because of the reflection not influenced by the thickness of the movable mirror. As a result, it becomes possible to increase the number of reflections per unit length, which makes a chirp greater in amount well controllable.

In an apparatus according to the present invention, there is no need to realign the optical axis each time a chirp is altered in amount. Also, since an amount of chirp per reflection is given, it is possible to ascertain an actual amount of chirp imparted to an input pulse, readily from the number of reflections made for the pulse. Also, using a dielectric multilayer film mirror, the apparatus can well endure a high-energy light pulse. Also, being simple in structure, the apparatus can be made smaller in size and excels in cost reduction and easiness for using. Thus, an apparatus according to the present invention overcomes all of the problems met by the conventional chirp amount control apparatus.

BRIEF DESCRIPTION OF THE DRAWINGS

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof. In the drawings, FIG. 1 diagrammatically illustrates the makeup of a linear opto-frequency chirp amount variable apparatus as a first form of implementation of the present invention.

BEST MODE FOR CARRYING OUT THE INVENTION

Figure 1:
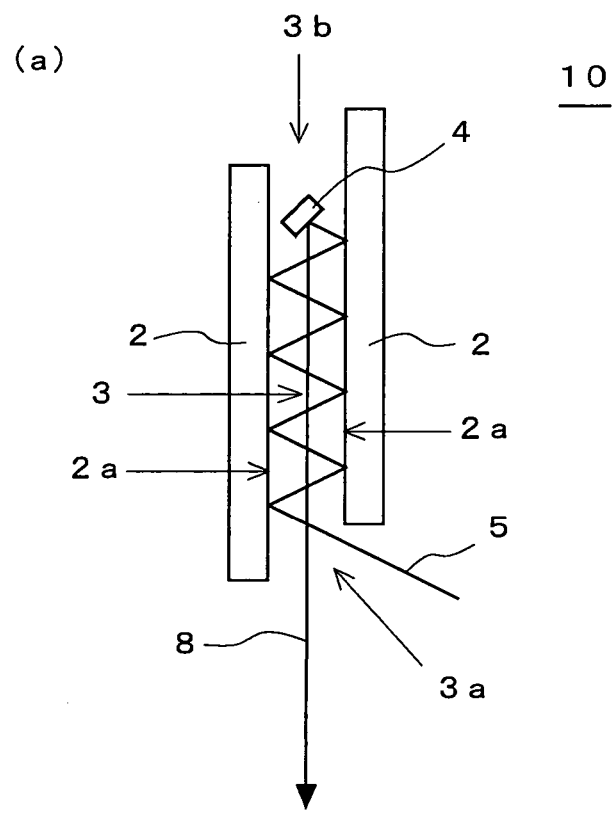
Figure 1:
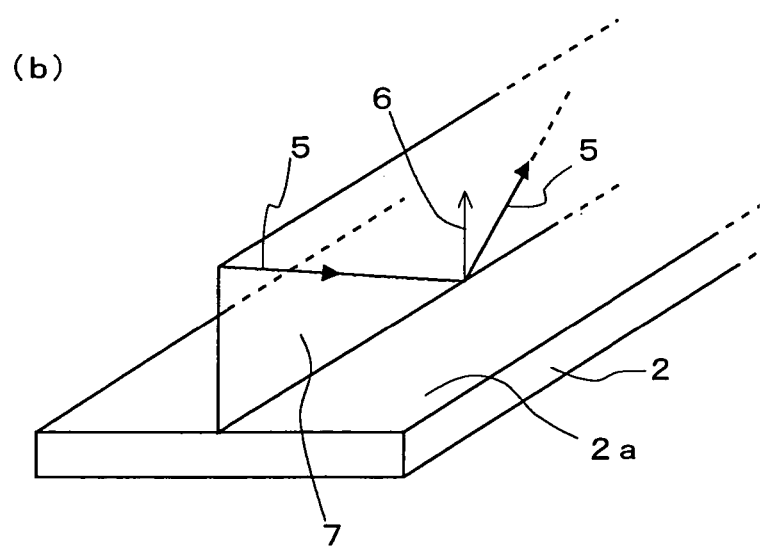

Hereinafter, the present invention will be described in detail with reference to certain suitable forms of implementation thereof illustrated in the drawing figures wherein same reference numerals are used to designate same parts or components.

FIG. 1 diagrammatically illustrates the makeup of a linear opto-frequency chirp amount variable apparatus 10 as a first form of implementation of the present invention in which there are shown at (a) the apparatus makeup and at (b) typically an incidence plane that is determined by an incident light direction and a normal to a dielectric multilayer film mirror surface. According to the present invention, the linear opto-frequency chirp amount variable apparatus 10 as shown in FIG. 1(a) comprises a pair of dielectric multilayer film mirrors 2 and 2 which are arranged so that their mirror surfaces 2a and 2a extend parallel, and are opposed, to each other, and a movable mirror 4 which is disposed in a space 3 defined between the dielectric multilayer film mirrors 2 and 2 and which is inclined at a given inclination and movable in a given direction.

The dielectric multilayer film mirrors 2 and 2 are each formed, as mentioned previously, from two or more optical films different in index of refraction (dielectric constant) and by laminating such films alternately a plurality of times while controlling their thicknesses so that light reflected from the laminate has a phase proportional to frequency (see Reference 8 supra). This arrangement using optical materials, such as $SiO_2$ and $TiO_2$, which are high in the damaging threshold to light energy, to form the dielectric multilayer film can well endure the use of a high energy light pulse.

The inclination at which the movable mirror 4 is inclined is an inclination such that an input or incoming light ray 5 that is incident obliquely from one end 3a of the space 3 and is then allowed to reflect on and between the dielectric multilayer film mirror surfaces 2a and 2a a plurality of times is reflected into a direction parallel to the dielectric multilayer film mirror surfaces 2a and 2a in an incidence plane 7 and towards the one end 3a of the space 3. Here, the incidence plane as is apparent from FIG. 1(b) is a plane 7 defined by a ray vector of the incident light ray 5 and a plane-normal 6 vector of the mirror surface 2a of each dielectric multilayer film mirror 2. This term and also the term "angle of incidence" which is used to mean an angle that the ray vector of the incident beam 5 makes with the plane-normal vector 6 will be used hereafter to mean as defined here.

The movable mirror 4 can be moved in a direction that is parallel to the dielectric multilayer film mirror surfaces 2a and extends in the incidence plane, and can be moved in this direction forwards and backwards to change the amount of a chirp to be imparted to the input light.

According to the makeup mentioned above, an input light ray 5 incident from the one end 3a of the two dielectric multilayer film mirrors 2 and 2 arranged parallel to each other is reflected by and between the dielectric multilayer film mirror surfaces 2a and 2a a plurality of times, reaching the movable mirror 4 where it is further reflected by the movable mirror 4 to become a light ray that is parallel to the dielectric multilayer film mirror surfaces 2a and 2a, resulting in an output or outgoing light 8. Thus, moving the movable mirror 4 forwards or backwards to change the number of reflections of the input light allows a chirp with an amount proportional to the number of such reflections to be imparted thereto while maintaining the direction in which an output light 8 issues constant regardless of a position which the movable mirror 4 takes. As a result, there is here provided a linear opto-frequency chirp amount variable apparatus which has no need to realign the optical axis each time the amount of a chirp is to be altered or to additionally include any optical system for alignment of the optical axis and which thus excels in cost reduction and easiness for using.

An explanation is next given of a linear opto-frequency chirp amount variable apparatus that constitutes a second form of implementation of the present invention.

Figure 2:
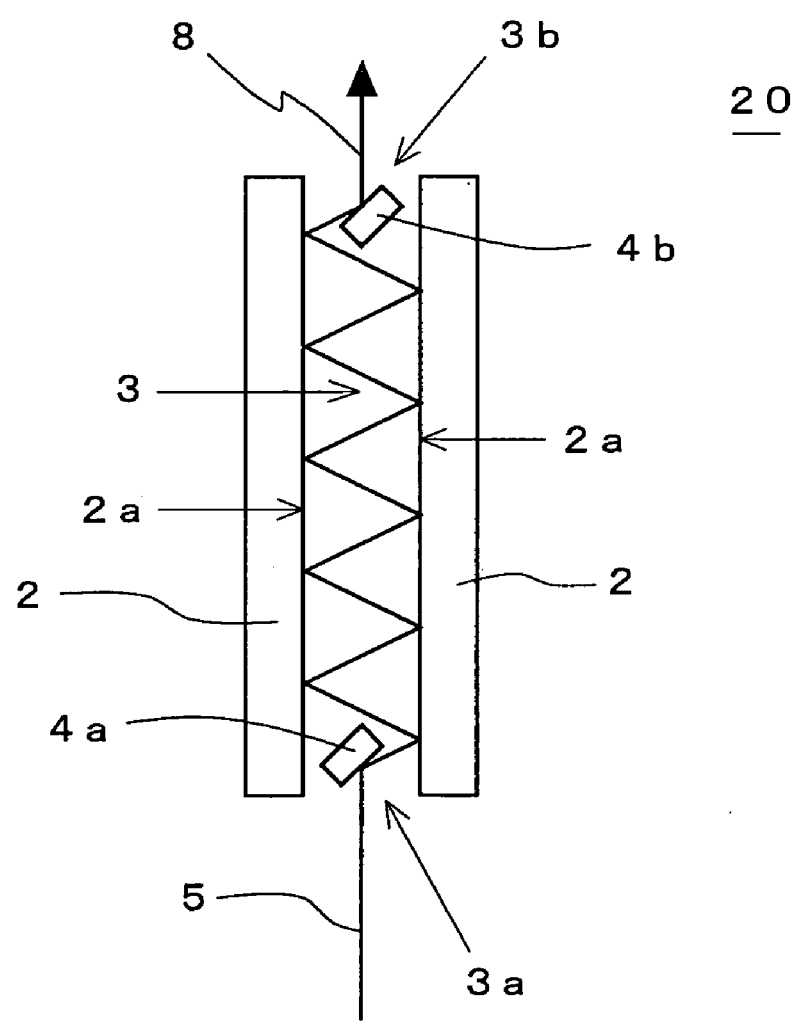
FIG. 2 diagrammatically illustrates the makeup of a linear opto-frequency chirp amount variable apparatus as a second form of implementation of the present invention.

FIG. 2 diagrammatically illustrates the makeup of a linear opto-frequency chirp amount variable apparatus that constitutes a second form of implementation of the present invention. While in the apparatus shown in FIG. 1 light is incoming and outgoing in different directions, the light incoming and outgoing directions are aligned with each other in this apparatus. The linear opto-frequency chirp amount variable apparatus 20 in the second form of implementation comprises a pair of dielectric multilayer film mirrors 2 and 2 arranged so that their mirror surfaces 2a and 2a extend parallel, and are opposed, to each other, and a first and a second movable mirror 4a and 4b which are disposed in a space 3 defined between the two dielectric multilayer film mirrors 2 and 2 and each of which is inclined at a given inclination and movable in a given movable direction.

The inclination of the first movable mirror 4a is an inclination such that an incident light 5 that is incident parallel to the dielectric multilayer film mirror surfaces 2a and 2a from one end 3a of the space 3 is reflected by the first movable mirror so as to reflect on and between the dielectric multilayer film mirror surfaces 2a and 2a a plurality of times towards the other end 3b of the space 3.

The inclination of the second movable mirror 4b is an inclination such that the incident light having so reflected a plurality of times is reflected by the second movable mirror into a direction parallel to the dielectric multilayer film mirror surfaces 2a and 2a in the incidence plane 7 and towards the other end 3b of the space 3.

The direction in which the movable mirrors 4a and 4b can be moved is a direction that is parallel to the dielectric multilayer film mirror surfaces 2a and 2a and extends in the incidence plane 7, so that moving the first or second movable mirrors 4a and 4b forwards or backwards in this direction changes the distance between them, thereby changing the amount of a chirp to be imparted to the incident light as an input light.

According to the makeup mentioned above, an incoming light 5 incident parallel to the dielectric multilayer film mirror surfaces 2a and 2a from one end of the two dielectric multilayer film mirrors 2 and 2 arranged parallel to each other is allowed to be reflected by the first movable mirror 4a so as to reach the second movable mirror 4b upon reflecting on and between the two dielectric multilayer film mirror surfaces 2a and 2a a plurality of times and then to be reflected by the second movable mirror 4b and to outgo from the other end 3b of the space 3 defined between the two dielectric multilayer mirrors 2 and 2 and in the same direction in which it is incident. Thus, moving the first or second movable mirror 4a, 4b forwards or backwards allows changing the amount of a chirp to be imparted to the incident light as an incoming light while permitting an outgoing light to propagate in the same direction as the incoming light.

An explanation is next given of a linear opto-frequency chirp amount variable apparatus that constitutes a third form of implementation of the present invention.

Figure 3:
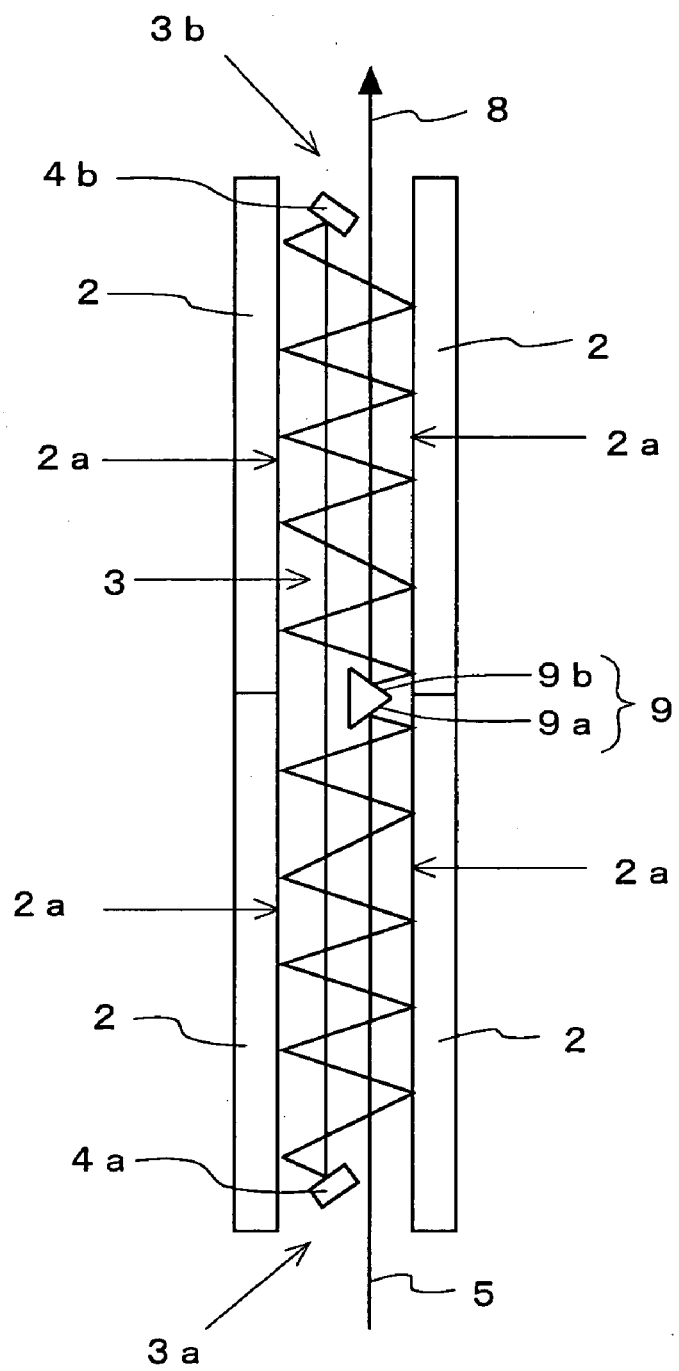
FIG. 3 diagrammatically illustrates the makeup of a linear opto-frequency chirp amount variable apparatus as a third form of implementation of the present invention.

FIG. 3 diagrammatically illustrates the makeup of a linear opto-frequency chirp amount variable apparatus that constitutes a third form of implementation of the present invention. The apparatus shown in FIG. 2 has a limitation in the angle of incidence in that if the light is incident at a small angle of incidence, upon reflection it will be obstructed by the thickness of the movable mirror as is apparent from the Figure. The apparatus of the third form of implementation has the feature that it allows reducing the angle of incidence and thus increasing the amount of a chirp to be imparted. In accordance with the third form of implementation, the linear opto-frequency chirp amount variable apparatus 30 comprises a pair of dielectric multilayer film mirrors 2 and 2 arranged so that their mirror surfaces 2a and 2a extend parallel, and are opposed, to each other, a fixed mirror 9 disposed in a space 3 defined between the two dielectric multilayer film mirrors 2 and 2 at a center of the space, and a first and a second movable mirror 4a and 4b which are disposed at opposite sides of the fixed mirror 9, respectively.

The fixed mirror 9 has a first and a second reflecting surface 9a and 9b each of which is inclined at a given inclination, and the first and second movable mirrors 4a and 4b have their respective angles of inclination and are movable in a given direction. The inclination of the first reflecting surface 9a of the fixed mirror 9 is an inclination such that an incident light 5 that is incident parallel to the dielectric multilayer film mirror surfaces 2a and 2a from one end 3a of the space 3 is reflected by the first reflecting surface 9a so as to reflect on and between the dielectric multilayer film mirrors 2a and 2a a plurality of times in an incidence plane 7 and then to return to the first movable mirror 4a. And, the inclination of the first movable mirror 4a is an inclination such that the incident light 5 having so reflected a plurality of times is reflected by the first movable mirror 4a into a direction that is parallel to the dielectric multilayer film mirror surfaces 2a and 2a and extends in the incidence plane 7, towards the second movable mirror 4b. And, the inclination of the second movable mirror 4b is an inclination such that the light having reflected from the first movable mirror 4a is reflected by the second movable mirror 4b so as to reflect on and between the dielectric multilayer film mirror surfaces 2a and 2a a plurality of times in the incidence plane 7 and then to return to the second reflecting surface 9b of the fixed mirror 9. And, the inclination of the second reflecting plane 9b of the fixed mirror 9 is an inclination such that the light from the second movable mirror 4b, upon having so reflected a plurality of times, is reflected by the second reflecting surface 9b into a direction that is parallel to the dielectric multilayer film mirror surfaces 2a and 2a in the incidence plane 7 and towards the other end 3b of the space 3.

The direction in which the movable mirrors 4a and 4b can be moved is a direction that is parallel to the dielectric multilayer film mirror surfaces 2a and 2a and extends in the incidence plane 7, so that moving the first or second movable mirror 4a, 4b forwards or backwards in this direction to change the distance between them changes the amount of a chirp to be imparted to the incident light as an input light.

According to the makeup mentioned above, an incoming light 5 incident parallel to the dielectric multilayer film mirror surfaces 2a and 2a from one end 3a of the two dielectric multilayer film mirrors 2 and 2 arranged parallel to each other is allowed to be reflected by the first reflecting surface 9a of the fixed mirror 9 so as to reach the first movable mirror 4a upon reflecting on and between the two dielectric multilayer film mirror surfaces 2a and 2a a plurality of times, then to be reflected by the first movable mirror 4a into a direction same as that in which it is incident to reach the second movable mirror 4b, then to be reflected by the second movable mirror 4b so as to reflect on and between the two dielectric multilayer film mirror surfaces 2a and 2a a plurality of times to reach the second reflecting surface 9b of the fixed mirror 9, and finally to be reflected by the second reflecting surface 9b of the fixed mirror 9 so as to outgo from the other end 3b of the space 3 in a direction same as that in which it is incident. Thus, moving the first or second movable mirrors 4a, 4b forwards or backwards to change the distance between them changes the amount of a chirp to be imparted to the incident light as an input light.

In the apparatus according to the third form of implementation in which a plurality of light reflections occur always in front of the reflecting surface of a movable mirror, the angle of incidence for a light ray incident on the movable mirror can be made smaller than those in the arrangements of FIGS. 1 and 2. Accordingly, an apparatus is provided that can control the number of reflections for an input light by controlling the distance between the first and second movable mirrors 4a and 4b and can thus impart to the input light an amount of chirp proportional to the number of reflections thereof and that can issue an output light in a direction same as the input light is incident while permitting its angle of incidence to be reduced. As a result, it becomes possible to increase the number of reflections per unit length, which makes a chirp greater in amount well controllable.

Mention is next made of a specific example of the present invention.

In carrying out this specific example, use was made of a linear opto-frequency chirp amount variable apparatus according to the first form of implementation of the present invention as shown in FIG. 1 in which for the dielectric multilayer film mirrors use was made of Sigma Koki Model GFM-SET-50fs2 manufactured by Sigma Koki, K. K.

For the incident or input light, use was made of a femtosecond light pulse, and with the use of the apparatus according to the first form of implementation, the movable mirror was varied in position to change the number of reflections, and instantaneous frequencies of the light pulse as the output light were measured using the FROG (Frequency Resolved Optical Gating) method (see Reference 6 supra).

Figure 4:
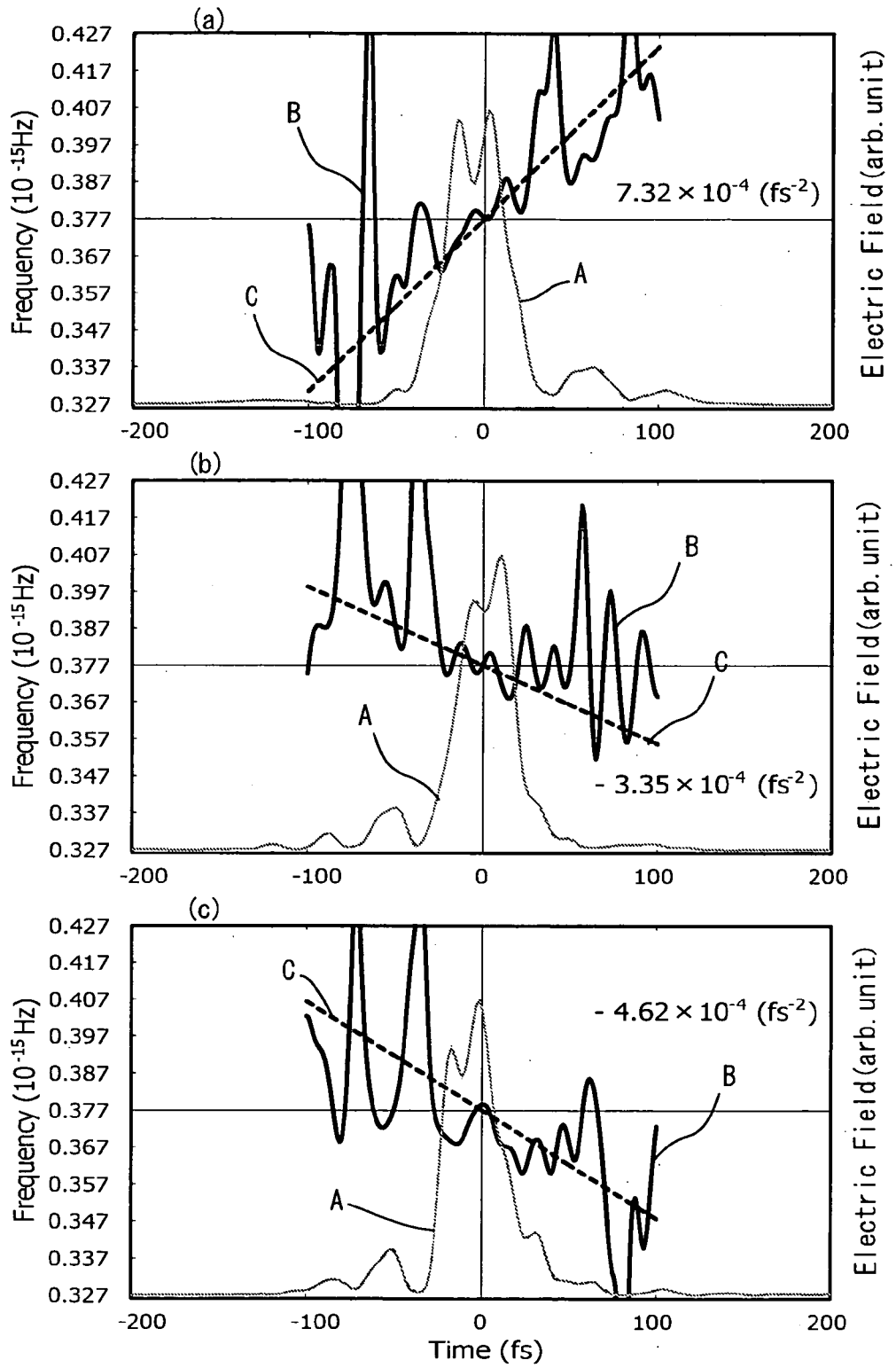
FIG. 4 graphically shows results of measurements in specific examples of the invention.
Figure 5:
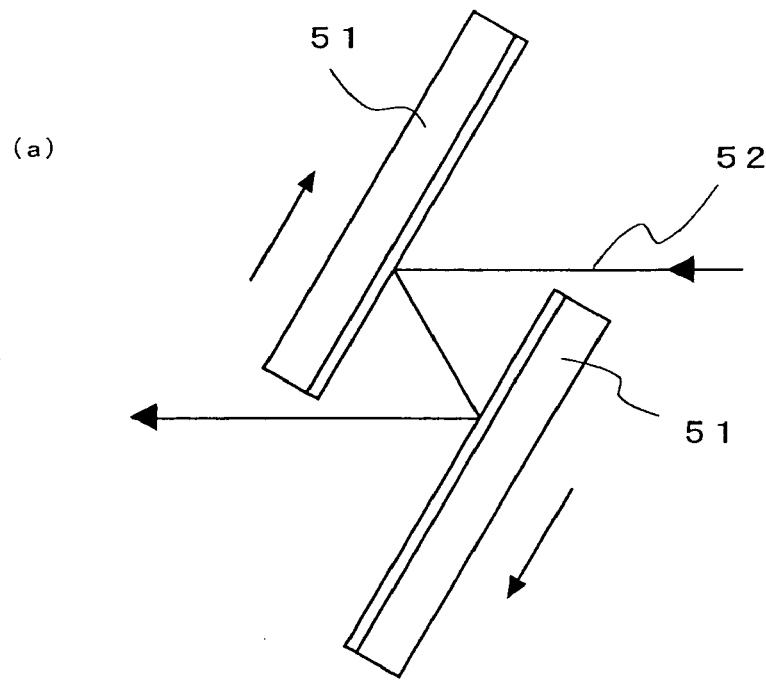
FIG. 5 schematically illustrates the schematic makeup a conventional linear chirp apparatus using dielectric multilayer film mirrors.
Figure 5:
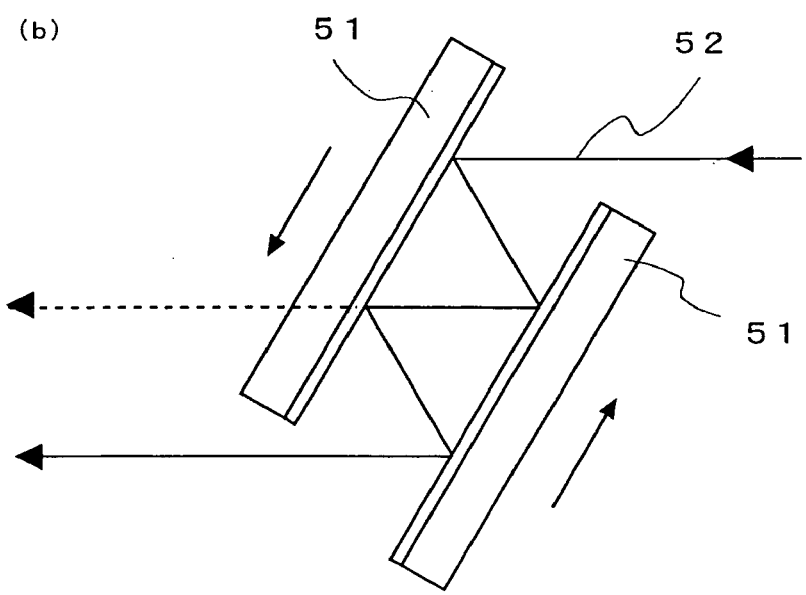

Results of the measurement are shown in graphs of FIG. 4 in which in each graph the abscissa axis represents time, and the right-hand side and left-hand side ordinate axes represent the electric field strength of the femtosecond light pulse (arbitrary memory) and its instantaneous frequency, respectively. These graphs shown in FIGS. 4(a), 4(b) and 4(c), respectively, indicate the measurements taken when the number of reflections was increased in this order. In each of the graphs, the curve A represents a distribution of electric field strength of the femtosecond light pulse on the time axis, the curve B represents the output of the FROG measuring device, and the line C represents the instantaneous frequency derived from the curve B. By the way, the numeral in each graph indicates a change in frequency per unit time, called chirp rate, representing a gradient of the line C.

It is seen from the graphs that the line C has its gradient increased in negative direction as the number of reflections is increased, indicating that the amount of a negative linear chirp increases in proportion to the number of reflections. That the line C has a positive gradient in FIG. 4(a) is due to the fact that the femtosecond light pulse as the input light has a positive linear chirp which has not completely been compensated for with the number of reflections in measurement (a).

INDUSTRIAL APPLICABILITY

As will be appreciated from the foregoing description, an apparatus according to the present invention allows imparting a chirp that is large in amount over an extremely broad frequency range. Moreover, there is here no need to realign the optical axis each time a given chirp amount is to be imparted. An apparatus of the invention may also allow an output pulse to be emitted in a fixed direction regardless of a direction in which an input light pulse is incident, or an output light to be emitted in a direction same as that in which an input light pulse is incident.

Accordingly, the present invention is extremely useful, for forming a femtosecond light pulse, i. e., a light pulse that is narrower in pulse width, which will become indispensable henceforth, and when used in the fields of photochemical reactions, machining optical materials and ultrafast optical communication where it is imperative to control the amount of a chirp easily, at a reduced cost and as desired.

What is claimed is:

1. A linear opto-frequency chirp amount variable apparatus, characterized in that it comprises a pair of dielectric multilayer film mirrors arranged so that their mirror surfaces extend parallel, and are opposed, to each other, and a movable mirror which is disposed in a space defined between the two dielectric multilayer film mirrors and which is inclined at a given inclination and movable in a given movable direction, wherein said given inclination of the movable mirror is an inclination such that an incident light that is incident obliquely from one end of the space defined between the two dielectric multilayer film mirrors and is then allowed to reflect on and between them a plurality of times and is reflected by the movable mirror into a direction parallel to said dielectric multilayer film mirror surfaces in an incidence plane defined by said incident light and a plane-normal of said dielectric multilayer film mirror and towards said one end, and said given movable direction is a direction that is parallel to said dielectric multilayer film mirror surfaces and extends in said incidence plane, whereby moving said movable mirror forwards and backwards in said movable direction changes the amount of a chirp to be imparted to said incident light as an input light.

2. A linear opto-frequency chirp amount variable apparatus, characterized in that it comprises a pair of dielectric multilayer film mirrors arranged so that their mirror surfaces extend parallel, and are opposed, to each other, and a first and a second movable mirror which are disposed in a space defined between the two dielectric multilayer film mirrors and each of which is inclined at a given inclination and movable in a given movable direction, wherein said given inclination of the first movable mirror is an inclination such that an incident light that is incident parallel to said dielectric multilayer film mirror surfaces from one end of the space defined between said multilayer film mirrors is reflected by the first movable mirror so as to reflect on and between said mirror surfaces a plurality of times in an incidence plane defined by said incident light and a plane-normal of said dielectric multilayer mirror, said given inclination of the second movable mirror is an inclination such that said incident light having reflected a plurality of times as aforesaid is reflected by the second movable mirror into a direction parallel to said dielectric multilayer film mirror surfaces in said incidence plane and towards the other end of said space, said given movable direction is a direction that is parallel to said dielectric multilayer film mirror surfaces and extends in said incidence plane, whereby moving said first or second movable mirror forwards or backwards in said movable direction to change the distance between them changes the amount of a chirp to be imparted to said incident light as an input light.

3. A linear opto-frequency chirp amount variable apparatus, characterized in that it comprises a pair of dielectric multilayer film mirrors arranged so that their mirror surfaces extend parallel, and are opposed, to each other; a fixed mirror disposed in a space defined between the two dielectric multilayer film mirrors at a center of the space, the fixed mirror having a first and a second reflecting surface each of which is inclined at a given inclination; and a first and a second movable mirror which are disposed at opposite sides of the fixed mirror, respectively, and each of which is movable in a given movable direction, wherein said given inclination of the first reflecting surface of said fixed mirror is an inclination such that an incident light that is incident parallel to said dielectric multilayer film mirror surfaces from one end of the space defined between said two dielectric multilayer film mirrors is reflected by said first reflecting surface so as to reflect on and between said dielectric multilayer film mirrors in an incidence plane defined by said incident light and a plane-normal of said dielectric multilayer mirror surface, said given inclination of the first movable mirror is an inclination such that the incident light having reflected a plurality of times as aforesaid is reflected by said first movable mirror into a direction that is parallel to said dielectric multilayer film mirror surfaces and extends in said incidence plane, a plurality of times towards said second movable mirror, said given inclination of the second movable mirror is an inclination such that the light having reflected from said first movable mirror is reflected by said second movable mirror so as to reflect on and between said dielectric multilayer film mirrors a plurality of times in said incidence plane, said inclination of the second reflecting surface of said fixed mirror is an inclination such that the light from said second movable mirror, upon having reflected a plurality of times as aforesaid, is reflected by said second reflecting surface into a direction that is parallel to said dielectric multilayer film mirror surfaces in said incidence plane and towards the other end of said space, and said given movable direction is a direction that is parallel to said dielectric multilayer film mirror surfaces and extends in said incidence plane, whereby moving said first or second movable mirror forwards or backwards in said movable direction to change the distance between them changes the amount of a chirp to be imparted to said incident light as an input light.

* * * * *